United States Patent [19]

Petrella et al.

[11] Patent Number: 5,168,009

[45] Date of Patent: Dec. 1, 1992

[54] TERTIARY AMINE CATALYST COMPOSITION FOR POLYURETHANE FOAM IN CONTACT WITH POLYVINYL CHLORIDE

[75] Inventors: Robert G. Petrella, Allentown, Pa.; James D. Tobias, Flatrock, Mich.

[73] Assignee: Air Products and Chemicals, Inc., Allentown, Pa.

[21] Appl. No.: 590,573

[22] Filed: Sep. 27, 1990

[51] Int. Cl.$^5$ .................... B32B 3/26; B32B 27/40
[52] U.S. Cl. .................... 428/313.5; 428/319.3; 521/51; 521/128; 521/155; 521/163
[58] Field of Search .............. 521/51, 128, 155, 163; 428/313.5, 319.3

[56] References Cited

U.S. PATENT DOCUMENTS

| | | | |
|---|---|---|---|
| 3,728,291 | 4/1973 | Carroll et al. | 521/112 |
| 3,862,150 | 1/1975 | Bechara et al. | 544/351 |
| 4,310,448 | 1/1982 | Reischl | 521/163 |
| 4,981,876 | 1/1991 | Grimmer | 521/49 |

OTHER PUBLICATIONS

V. R. Struber, "Extending the Stability of Automotive Vinyl Interiors" *Plastic Compounding* Jul.-Aug. 1990; pp. 48-52.

Primary Examiner—John Kight, III
Assistant Examiner—John M. Cooney, Jr.
Attorney, Agent, or Firm—Michael Leach; James C. Simmons; William F. Marsh

[57] ABSTRACT

A stain resistant polyvinyl chloride covered polyurethane foam article in which the polyurethane foam is made using a tertiary amine catalyst composition in which the amine functionality is 10-40 mole % neutralized with an acid composition consisting essentially of 10-100 mole % strong acid and 0-90 mole % weak acid.

18 Claims, No Drawings

TERTIARY AMINE CATALYST COMPOSITION FOR POLYURETHANE FOAM IN CONTACT WITH POLYVINYL CHLORIDE

TECHNICAL FIELD

The present invention relates to tertiary amine catalyst compositions for making polyurethane foam. More particularly, the invention relates to such catalyst compositions for making polyurethane foam which is clad with polyvinyl chloride (PVC).

BACKGROUND OF THE INVENTION

Polyvinyl chloride-clad urethane foam is used extensively as trim components in automobiles. The styling of the contemporary automobiles radically expands the amount of PVC-clad polyurethane foam components exposed to the sunlight. The rakish windshield angles allow the top of the dashboards to attain temperatures as high as 260° F. Such prolonged exposure to sunlight leads to discoloration (staining) and eventually cracking and splitting of the PVC skin. This extreme thermal and ultraviolet stress is exacerbated by the volatile or fugitive amines in the polyurethane foam.

In order to obtain the sweeping angles and curves typical of present day automotive interior trim components such as dash pads, consoles, arm and head rests, the PVC skins have been made thinner with a higher level of plasticizer.

One of the most significant contributors to discoloration is believed to be the thermally induced vaporization of the amine catalysts used to make the polyurethane foam. These catalysts are believed to migrate into the PVC and dehydrohalogenate the PVC forming polybutene, a black, brittle material.

The industry has attempted to improve the PVC staining resistance of the trim parts. One approach is to paint the part after the foaming composition has been poured onto the PVC skin. This is an expensive procedure prone to high rework rates that increase the costs. Another attempt has been to use non-fugitive amine catalysts. The non-fugitive catalyst contains one or more active hydrogen groups in the molecule that react with the isocyanate moiety and are permanently fixed into the foam. These catalysts produce a reasonable solution to the staining problem but create another problem which is the production of high internal pressures within the foam as it flows through the instrument panels. The result of this high internal pressure is to create voids under the PVC skin. These voids are visible and tactile.

Another attempt to solve the PVC staining problem is to use vinyl amine scavengers such as chlorinated phosphate esters. These materials have to be included in the isocyanate part of the polyurethane mix because they would deactivate the amine catalysts if added to the polyol component containing the amine catalyst. This approach has shown only marginal success.

SUMMARY OF THE INVENTION

The present invention provides for a stain resistant PVC-clad polyurethane foam article. The decrease in the discoloration of the polyvinyl chloride skin is provided by a polyurethane foam which is prepared using a tertiary amine catalyst composition according to the invention. The catalyst composition consists essentially of a tertiary amine urethane catalyst or mixture thereof whose amine functionality is 10–40 mole % neutralized with an acid composition which consists essentially of 10–100 mole % strong acid and 0–90 mole % weak acid.

The use of such partial salt of a tertiary amine catalyst composition provides a stain resistant PVC-clad polyurethane foam article (especially a semi-flexible polyurethane foam for use in automobile trim parts).

The amine catalyst composition provides the necessary catalysis to produce good foam parts and, after the PVC-clad part is placed in service, substantially reduces the PVC staining caused by amine migration into the PVC material. No painting of the trim parts is necessary to obtain a stain resistant PVC-clad polyurethane trim part.

DETAILED DESCRIPTION OF THE INVENTION

The preparation of polyvinyl chloride-clad polyurethane foam articles according to the invention first involves making a polyurethane foam using suitable organic polyisocyanates well known in the art, including hexamethylene diisocyanate, phenylene diisocyanate, toluene diisocyanate and 4,4'-diphenylmethane diisocyanate. Especially suitable are mixtures of diisocyanates known commercially as "crude MDI", also known as PAPI, which contains about 60% of 4,4'-diphenylmethane diisocyanate along with other isomeric and analogous higher polyisocyanates. Also suitable are "prepolymers" of these polyisocyanates comprising a partially prereacted mixture of polyisocyanates and polyether or polyester polyols. Other suitable isocyanates are the 2,4- and 2,6-toluene diisocyanates ("TDI") individually or together as their commercially available mixtures.

Illustrative of suitable polyols as a component of the polyurethane foam composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds including diols and triols, for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol and like low molecular weight polyols.

Useful polyester polyols include those produced by reacting a dicarboxylic acid with an excess of a diol, for example, adipic acid with ethylene glycol or butane diol, or reacting a lactone with an excess of a diol such as caprolactone and propylene glycol.

Other typical agents found in the polyurethane formulations include blowing agents such as water, methylene chloride, trichlorofluoromethane and the like, and cell stabilizers such as silicones.

A general semi-flexible polyurethane foam formulation would comprise the following components in parts by weight (pbw):

| SEMI-FLEXIBLE FOAM FORMULATION | |
|---|---|
| | Parts by Wt |
| 5000 MWt Triol | 80 to 90 |
| Graft or filled 5000–6000 MWt Triol | 10 to 20 |
| Cell Stabilizer | 0 to 1 |
| Blowing Agent | 0.5 to 2.5 |
| Crosslinker | 0.5 to 5 |

| SEMI-FLEXIBLE FOAM FORMULATION | |
|---|---|
| | Parts by Wt |
| Invention Catalyst | 0.4 to 3.5 |
| Isocyanate | 85 to 110 Index |

The most important component with regard to substantially eliminating the staining of the PVC skin is the catalyst composition for the polyurethane foam composition which consists essentially of tertiary amine compounds typically used in the art to catalyze the urethane reaction. The amine functionality of these tertiary amine compounds is partially neutralized with acid to 10–40 mole %, i.e. the catalyst is a partial salt in which 10–40 mole % of amine functionality is protonated. It is preferred that the amine functionality be about 20–40 mole % neutralized.

The acid composition for neutralizing the amine functionality consists essentially of 10–100 mole % strong acid, i.e. an acid having a pKa less than 1 and 0–90 mole % weak acid, i.e. an acid having a pKa of 1.23 to 4.22. Preferably the acid composition consists essentially of 20–80 mole % strong acid and 20–80 mole % weak acid.

Suitable strong acids which must be capable of forming salts with the tertiary amine compounds that are soluble in the polyol premix include p-toluene sulfonic acid, nitric acid, and the hydrohalide acids, namely hydrobromic and hydrochloric acid.

Suitable weak acids would include organic carboxylic acids of the general formula $RCO_2H$ where R is hydrogen, an alkyl group of 1-18 carbon atoms, an alkenyl group of 2-15 carbon atoms, benzyl or —$CH_2CN$. Representative acids include formic, acetic, hexanoic, straight and branched heptanoic, octanoic, decanoic and hexadecanoic acids; neo acids such as 3,3-dimethyl butanoic acid; unsaturated aliphatic acids such as oleic, acrylic, methacrylic and undecenoic acids, aromatic acids such as benzoic, phenylacetic and salicylic acid.

The preferred strong acid for use in making the partial salts of the tertiary amine catalyst, according to the invention, is hydrochloric acid and when a weak acid is used, the preferred weak acid is formic acid.

The tertiary amines which may be protonated with the acid composition to form partial amine salts may be any of the tertiary amine compounds typically used as catalysts for the urethane reaction. Such tertiary amines are well known to those skilled in the art and would include, by way of example, pentamethyldiethyltriamine, trimethylaminoethyl ethanolamine, tetramethylamino-bis-propylamine, 2,6-diaza-2,6-dimethyl-10-hydroxydecane, N-ethyl morpholine, N,N'-dimethylpiperazine, N,N-dimethylaminopropylamine, triethylenediamine, N,N-dimethylaminoethoxyethanol, N,N-diethylaminoethoxyethanol, tetramethyl-2-hydroxypropyl diethyltriamine, dimethylaminoethanol, hydroxypropyl piperazine, bis-dimethylaminoethyl piperazine and N,2-hydroxypropyl morpholine.

Preferred catalyst compositions are (a) 30–60% N,N-dimethylaminoethyl-N'-methylethanolamine, 10–35% pentamethyldiethyltriamine and 15–20% dimethylaminopropylamine and (b) 30–60% N,N-dimethylaminoethyl-N'-methylethanolamine, 10–35% pentamethyldiethyltriamine, 15–30% N-ethylmorpholine and 0–15% dimethylaminopropylamine.

The catalyst composition can be prepared by charging the tertiary amine(s) to a reaction vessel. Sufficient acid is then added to neutralize one amine equivalent from 10–40%, preferably about 20%. Where the acid composition comprises more than one acid, their combined usage should not exceed the desired neutralization level. Most preferred is a combination of hydrochloric and formic acids, ideally used to achieve a 20 mole % neutralization. The catalyst compositions are used in amounts of about 1–4 parts by weight per 100 parts polyol (php) to produce the necessary catalytic response.

In order to demonstrate the performance of the catalyst compositions according to the invention in the following examples, slush molded PVC skins were placed in a mold and the following semi-flexible polyurethane foam composition was poured over the skin:

| SEMI-FLEXIBLE POLYURETHANE FOAM COMPOSITION | |
|---|---|
| Component | Parts by Wt. |
| 5000 MWt ethylene oxide capped triol | 83 |
| 5000 MWt styrene-acrylonitrile graft triol | 17 |
| 800 MWt neutral sucrose-based polyol | 2.6 |
| Triethanolamine | 0.87 |
| Silicone surfactant | 0.44 |
| Water | 2.2 |
| Catalyst | Varied |
| Modified polymeric methane diphenyl diisocyanate (MDI) | 100 Index |

The mold was closed and the foam permitted to rise and cure in direct contact with the PVC skin. The curing conditions were ambient to 120° F. for 2–8 minutes. The PVC-clad foam composite was demolded and cut into test portions of 4×4" square and 1" thick. These test portions were placed in an oven at about 300° F. After 8 hours, the samples were checked visually every hour to see whether the characteristic black stain developed. Thirty hours resistance at 300° F. is the goal for automotive applications. Most catalysts failed the oven test at less than 20 hours.

The mold temperature and mold reaction time would be those typically used for the particular mold and polyurethane foam composition, and would range from 25° to 50° C. for mold temperature and 1 to 6 min for mold reaction time.

EXAMPLE 1

Several tertiary amines possessing reactive hydrogens capable of reacting with isocyanate functionality were used to catalyze the above semi-flexible polyurethane foam composition.

Sand colored plastisol vinyl (0.060 mil thick) was placed in the bottom of a 1" deep ×8"×8" mold to form a foam/vinyl skin composite. The foam components were mixed together for 8 seconds at 4000 RPM and poured into the mold. The mold temperature was 90° F. and the pads demolded at 6 minutes. After a 24 hour post-cure, a 4"×4" sample was cut from the pad and placed in an oven at 300° F. The samples were inspected hourly until the onset of staining was observed.

Mold pressures were obtained by pouring a 210 g wet chemical charge into a 1" deep maze mold. A pressure transducer connected to a strip chart was used to record the pressure developed within the mold. The results of these tests are shown in Table 1.

TABLE 1

| Run | Catalyst | PHP | Maze Mold Max. Pressure | Vinyl Staining (Hrs. at 300° F.) |
|-----|----------|-----|------------------------|----------------------------------|
| 1 | DMEA | 1.5 | 8.9 | 15.5 |
| 2 | DEME | 1.2 | 9.85 | 14 |
| 3 | DPMP | 1.3 | 7.63 | 14 |
| 4 | 2H,TMDETA | 1.12 | 9.0 | 15 |
| 5 | 85% DMAEE 15% B(DMAEE) | 0.75 | 11 | 13 |

DMEA — N,N-Dimethylaminoethanol
DEME — N,N-Dimethylaminoethyl-N'-methylaminoethanol
DPMP — 2,2-N-Dimethyl-6-N-methyl-2,6-diazanonanal
2H,TMDETA — N,N,N",N"-Tetramethyl-N'-2-hydroxypropyldiethylenetriamine
DMAEE — N,N-Dimethylaminoethoxyethanol
BDMAEE — Bis(dimethylaminoethyl)ether None of the catalysts shown in Table 1 approached the desired 30 hours vinyl staining resistance goal. All the catalysts also produced relatively high maze mold pressures. These results demonstrate that reactive amines cannot meet the vinyl staining, low maze mold pressures required by industry.

EXAMPLE 2

The first attempt to reduce the staining of plastisol vinyl skins in contact with polyurethane foam was to use amine scavengers such as the chlorinated phosphate ester or a metal oxide. They were added directly to the foam formulation. Table 2 shows the effect of the scavengers.

TABLE 2

| | Hours of Vinyl Staining Resistance @ 300° F. | | | | |
|---|---|---|---|---|---|
| Scavenger | None | TCEP | | MgO | |
| Scavenger Level (php) | — | 2 | 5 | 0.5 | 1 |
| Catalyst (php) | | | | | |
| 85% DMAEE 15% DBMAEE (0.75) | 13–14 | 16–17 | 16–17 | — | — |
| 60% PMDETA 20% BDMAPA 20% DMEA (1.1) | 11 | 13–14 | 13–14 | 11 | — |
| 14% PMDETA 43% BDMAPA 43% DMEA (1.1) | 13–14 | 16–17 | 16–17 | — | 16–17 |

PMDETA — Pentamethyl diethyltriamine
BDMAPA — Bis(dimethylaminopropyl)amine
TCEP — Tris-2-chloroethyl phosphate The addition of 5 parts of the tris-2-chloroethyl phosphate or 1 part of magnesium oxide provided some improvement in vinyl staining resistance but not nearly enough to approach the 30 hour target. Addition of higher levels adversely affected the foam processing and the final properties of the cured foam. These results demonstrate that the addition of amine scavengers do not provide sufficient improvement to be considered a solution to the vinyl staining problem.

EXAMPLE 3

The mixed acid salts of the amines embodying this invention can be prepared by at least two methods. The first method entails the preparation of a single amine, single acid partial salt. Partial salt means that 10 to 50 mole % of one nitrogen of the selected amine is neutralized by the addition of an acid. The individual amine acid partial salts are subsequently blended together to produce the desired concentration of amine(s) acid(s) partial salts to provide the desired benefits. Such amine salts can be prepared in the following manner. The amine is charged to a three neck reaction flask equipped with a reflux condenser, thermometer, stirring shaft and pad and an addition funnel. The flask is immersed in an ice water bath. The acid is charged to the addition funnel. With the amine being stirred, the acid is dripped into the amine at a rate such that the reaction mass does not exceed 50° C. Upon completion of the acid addition, the reaction mass is stirred for an hour. The following salts were prepared by this method.

TABLE 3

| Run | A | B | C | D | E | F |
|-----|---|---|---|---|---|---|
| DEME | 73 g | | | | | |
| Hydrochloric acid (37%) | 88.8 | 49.3 | 19.7 | — | — | — |
| Formic acid (90%) | — | — | — | 46.0 | 25.6 | 10.2 |
| mole % protonated | 90 | 50 | 20 | 90 | 50 | 20 |

The individual salts whose composition are shown in Table 3 can be blended together to achieve a particular ratio of acid blocked amines. For example, adding 8 parts of A to 2 parts of D will produce a blend consisting of DEME blocked 90 mole % by 80/20 hydrochloric acid/formic acid. This can be subsequently blended with other amine partial acid salts to derive a desired catalyst composition.

A second method would utilize the same reaction equipment except two addition funnels would be used. The requisite level of acids would be placed in each funnel and both would be simultaneously dripped into the amine. The addition would be such that the reaction mass temperature would not exceed 50° C.

EXAMPLE 4

This example compares the effectiveness of various percentages of amine blocking of 20, 50 and 90 mole % of the first nitrogen atom of each compound, using 4:1, 1:1 and 1:4 molar blends of the hydrochloric acid: formic acid salts. The vinyl skin used in this example was a 0.060 inch thick garnet red slush molded material. The garnet red color vinyl is the most sensitive color for staining. The garnet red skin was placed in the bottom of a 1 inch deep mold and the foam components poured on top of it. The mold temperature was 95°–100° F. and demold times were 6 minutes. The pads were allowed to post-cure at least 24 hours at the ambient temperatures before a 4 inch 4 inch square was cut from it. The garnet red vinyl skin/polyurethane foam composite specimens were placed in a non-vented circulating air oven at 300° F. The following amine blend was used in all runs:

TABLE 4

| | wt % |
|---|---|
| DEME | 52 |
| PMDETA | 10 |
| DMAPA | 20 |
| Dipropylene glycol | 18 |

| RUN | G | H | I | J | K | L | M |
|-----|---|---|---|---|---|---|---|
| Model System Test Catalyst | 100 | 100 | 100 | 100 | 100 | 100 | 100 |
| 1 | 3.8 | | | | | | |
| 2 | | 2.9 | | | | | |
| 3 | | | 2.2 | | | | |
| 4 | | | | 2.0 | | | |
| 5 | | | | | 1.65 | | |
| 6 | | | | | | 1.35 | |
| 7 | | | | | | | 0.74 |
| % Molar Blocking | 90 | 90 | 50 | 40 | 20 | 20 | 0 |
| HCl/HCO$_2$H | 4/1 | 1/4 | 1/1 | 3.8/1 | 4/1 | 1/4 | — |
| Modified MDI | 44.3 | 44.3 | 44.3 | 44.3 | 44.3 | 44.3 | 44.3 |
| Vinyl Staining Resistance | 14.0 | 15.0 | 16.5 | 19.0 | 21.0 | 21.5 | 15 |

TABLE 4-continued (hours @ 300° F.)

The vinyl staining results shown in Table 4 clearly demonstrate the significant improvement in vinyl staining resistance that occurs when the amine blend is blocked at 40 mole % or less by the mixed acid salts. This result is not anticipated. Rather one would have predicted that the higher the mole % blocking, the greater the vinyl staining resistance. One would have assumed that the more acid salt formed, the less mobile the resulting amine salt would be in the foam and that the reduced mobility of the amine salts would lessen the potential for amine-PVC contact.

The 50 mole % blocked amine composition provide approximately a 10 percent improvement. The 40 mole % blocked amine package provides a 27 percent improvement, while the 20 mole % blocked amine package exhibited a 40 percent improvement in vinyl staining resistance.

EXAMPLE 5

This example demonstrates the mixed acid salts are effective when used with another amine, N-ethylmorpholine (NEM) replacing DMAPA or when the amine blend used in the preceeding examples is used at different concentrations.

| RUN | N | O | P |
|---|---|---|---|
| DEME | 35 | 35 | 35 |
| PMDETA | 35 | 35 | 35 |
| NEM | 15 | 30 | — |
| DMAPA | 15 | — | 30 |
| Mole % Blocked | 23 | 27 | 27 |
| HCl/HCO$_2$H | 0.89/1 | 0.89/1 | 0.89/1 |
| Vinyl Staining Resistance (hours @ 300° F.) | 33 | 28 | 27 |

Comparing these results with the catalyst Run M in Example 4, the improvement in vinyl staining resistance was 120, 87 and 80 percent respectively for the three catalyst blends (Runs N-P). These results coupled with the results of Table 4 indicate the optimum vinyl staining resistance occurs between 20 and 27 mole % blocked amines. The ratio of hydrochloric acid to formic acid can vary from 4:1 to 1:4 within the range of the given percent of blocking for the amine blend used.

STATEMENT OF INDUSTRIAL APPLICATION

The invention provides a polyurethane catalyst composition for preparing semi-flexible polyurethane foam for making vinyl clad foam articles exhibiting substantially reduced PVC staining.

We claim:

1. In a polyurethane foam article clad with a polyvinyl chloride skin, the improvement which comprises a polyurethane foam prepared using a catalyst composition consisting essentially of a tertiary amine urethane catalyst or mixtures thereof whose amine functionality is 10–40 mole % neutralized with an acid composition which consists essentially of 20–80 mole % strong acid having a pKa less than 1 and 20–80 mole % of a weak acid having pKa 1.23 to 4.22.

2. The polyvinyl chloride clad foam article of claim 1 in which the strong acid is a hydrohalide acid.

3. The polyvinyl chloride clad foam article of claim 1 in which the strong acid is hydrochloric acid and the weak acid is formic acid.

4. The article of claim 1 in which the amine functionality is 20–40 mole % neutralized.

5. The article of claim 1 in which the amine functionality is 20–40 mole % neutralized.

6. The article of claim 5 in which the tertiary amine urethane catalyst composition comprises 30–60% N,N-dimethylaminoethyl-N'-methylethanolamine, 10–35% pentamethyldiethyltriamine and 15–20% dimethylaminopropylamine.

7. The article of claim 5 in which the tertiary amine urethane catalyst composition comprises 30–60% N,N-dimethylaminoethyl-N'-methylethanolamine, 10–35% pentamethyldiethyltriamine, 15–30% N-ethylmorpholine and 0–15% dimethylaminopropylamine.

8. The article of claim 6 in which the amine functionality is about 20 mole % neutralized.

9. The article of claim 7 in which the amine functionality is about 20 mole % neutralized.

10. The article of claim 1 which is an automotive interior trim component.

11. The article of claim 2 which is an automotive interior trim component.

12. The article of claim 3 which is an automotive interior trim component.

13. The article of claim 4 which is an automotive interior trim component.

14. The article of claim 5 which is an automotive interior trim component.

15. The article of claim 6 which is an automotive interior trim component.

16. The article of claim 7 which is an automotive interior trim component.

17. The article of claim 8 which is an automotive interior trim component.

18. The article of claim 9 which is an automotive interior trim component.

* * * * *